J. Gilbert.

Fire-Proof Building.

No. 2,794. Reissued Nov. 5, 1867.

Witnesses.
Wm Albert Stiel.
S. Ko. Bowie Godwin

Inventor.
J. Gilbert
By his Atty.
H. Howson.

United States Patent Office.

JOSEPH GILBERT, OF PHILADELPHIA, PENNSYLVANIA.

*Letters Patent No.* 64,659, *dated May* 14, 1867; *reissue No.* 2,794, *dated November* 5, 1867.

IMPROVED FIRE-PROOF CEILINGS AND ROOFS.

The Schedule referred to in these Letters Patent and making part of the same.

TO ALL WHOM IT MAY CONCERN:

Be it known that I, JOSEPH GILBERT, of Philadelphia, Pennsylvania, have invented an improved Fire-Proof Ceiling; and I do hereby declare the following to be a full, clear, and exact description of the same.

My invention consists of a ceiling composed of H-girders, corrugated plates, and certain socket-bearers, adapted to the said corrugated plates and girders, substantially as described hereafter, so as to form a cheap, light, and ornamental fire-proof ceiling. My invention further consists in combining with the above certain packing-blocks or bricks, in the manner and for the purpose described hereafter.

In order to enable others skilled in the art to make and apply my invention, I will now proceed to describe the manner of carrying it into effect, reference being had to the accompanying drawing, which forms a part of this specification, and in which—

Figure 1:
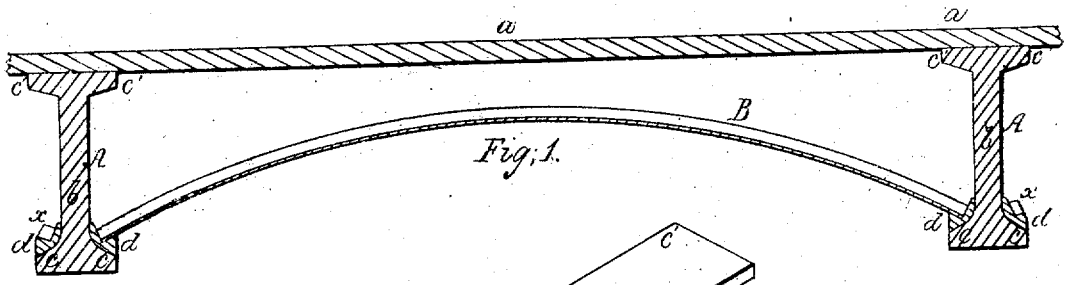

Figure 1 is a sectional elevation of a part of my improved ceiling.

Figure 2:
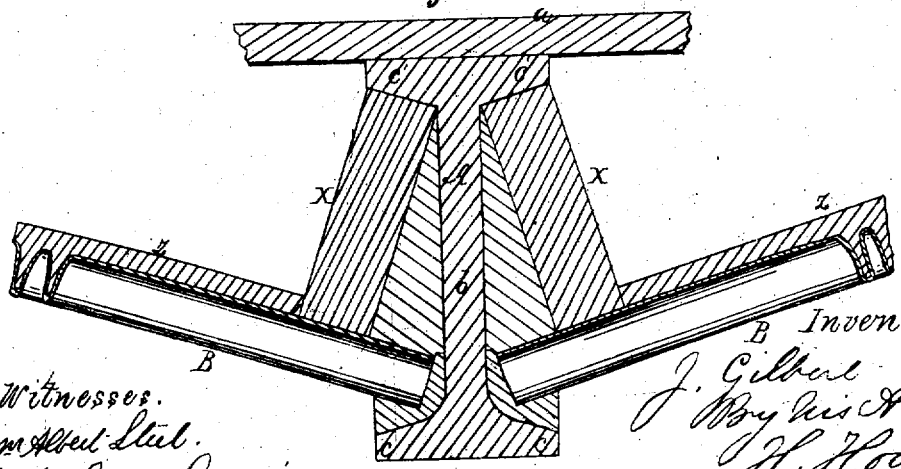

Figure 2, a detached sectional view, drawn to an enlarged scale.

Figure 3:
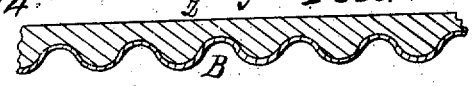

Figure 3, a section on the line 1–2, fig. 1; and

Figure 4:
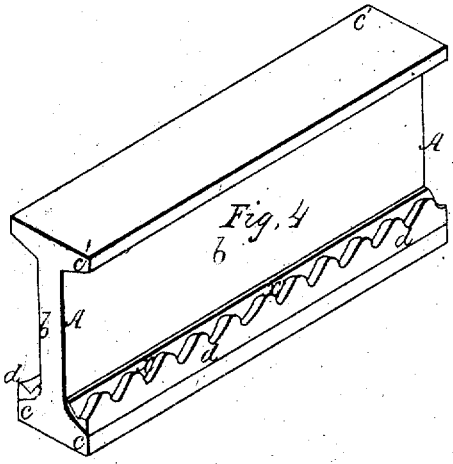

Figure 4 a perspective view.

A A are two of a series of parallel girders, of ordinary H-iron, the opposite ends of which project into the walls of a building, and on these girders rests the floor *a*. On each of the lower flanges *c* of each girder, and against the vertical portion *b*, rests a bearer, *d*, which has a corrugated recess or socket, *x*, at one side for the reception of one end of the corrugated metal plate B, the latter being arched, in the present instance, and resting at its opposite end in the socket or recess of a similar bearer, *d*, fitting on the flange and against the vertical portion of the adjacent girders. Against the lower sides of the upper flanges *c'* of each girder bear the upper ends of inclined bricks or blocks X X, the lower ends of which rest upon the corrugated plates B, the space between the bricks and the girders being filled with mortar or concrete; and upon the upper corrugated surface of the plate B is deposited a layer, *z*, of concrete, filling the corrugations, and extending an inch or thereabouts above the same. The edges of the plates B may be arranged to overlap each other to a limited extent, and thus form a continuous corrugated arch extending the length of the girders. The bearers *b* are in short sections, which may be readily fitted to the girders so as to form a continuous socket and abutment for the ends of the plates B. The parts composing the ceiling may be riveted together, or may be fitted to each other without using any fastenings. As but little manual labor, time, and skill are required in fitting the parts together, a ceiling of this character will cost one-fourth less than those in which arches, composed of bricks, extend between the girders; at the same time the improved ceiling will resist the action of fire quite as effectually as one of brick. In consequence of the slight weight of the plates B, compared with that of a brick arch, girders A much lighter than those usually employed may be used. The plates B, besides being greatly stiffened by their corrugations, are rendered still more rigid by the layer of concrete, and by the shape of the sockets, which, fitting the said corrugations in the plate, prevent the same from being distended laterally under pressure. Apart from the superior lightness and economy of a ceiling thus constructed, it will be seen that corrugated plates present a much more ornamental appearance than the usual plain arches. It will be evident that the bearers may be used in connection with straight corrugated plates, and that plates corrugated differently from those described may be employed, and braces of cast iron or other material may be substituted for the bricks or blocks X X, or the blocks may be dispensed with, and the entire space above the plates may be filled with concrete.

I claim as my invention, and desire to secure by Letters Patent—

1. A ceiling composed of girders, corrugated plates, and socket-bearers adapted to the said plates, and supported by the girders, all substantially as described.

2. In combination with the above I claim the bricks or blocks X X, applied substantially in the manner and for the purpose described.

In testimony whereof I have signed my name to this specification before two subscribing witnesses.

JOSEPH GILBERT.

Witnesses:

C. E. FOSTER,

JOHN WHITE.